US009875045B2

United States Patent
Atasu et al.

(10) Patent No.: US 9,875,045 B2
(45) Date of Patent: Jan. 23, 2018

(54) REGULAR EXPRESSION MATCHING WITH BACK-REFERENCES USING BACKTRACKING

(71) Applicant: International Business Machines Corporation, Armonk, NY (US)

(72) Inventors: Kubilay Atasu, Horgen (CH); Silvio Dragone, Winterthur (CH)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 14/809,617

(22) Filed: Jul. 27, 2015

(65) Prior Publication Data

US 2017/0031611 A1  Feb. 2, 2017

(51) Int. Cl.
- *G06F 3/06* (2006.01)
- *G06F 15/173* (2006.01)
- *G06F 9/44* (2006.01)

(52) U.S. Cl.
CPC .......... *G06F 3/0619* (2013.01); *G06F 3/065* (2013.01); *G06F 3/067* (2013.01); *G06F 3/0634* (2013.01); *G06F 9/444* (2013.01); *G06F 15/17375* (2013.01); *G06F 2207/025* (2013.01)

(58) Field of Classification Search
None
See application file for complete search history.

(56) References Cited

U.S. PATENT DOCUMENTS

| | | | | |
|---|---|---|---|---|
| 5,822,608 | A * | 10/1998 | Dieffenderfer | G06F 7/483 712/11 |
| 6,272,052 | B1 * | 8/2001 | Miyauchi | G06F 3/0613 365/185.29 |
| 6,754,802 | B1 * | 6/2004 | Kirsch | G06F 15/7821 711/173 |
| 7,181,578 | B1 * | 2/2007 | Guha | G06F 3/0607 711/154 |
| 7,240,040 | B2 * | 7/2007 | Wyschogrod | G06F 17/30985 706/48 |
| 7,464,254 | B2 * | 12/2008 | Sharangpani | G06F 17/30982 707/E17.04 |

(Continued)

OTHER PUBLICATIONS

'Scalable Parallel Programming' by Nickolls et al., ACM QUEUE Mar./Apr. 2008.*

(Continued)

*Primary Examiner* — Steven Snyder
(74) *Attorney, Agent, or Firm* — David Zwick

(57) ABSTRACT

A device for matching, in input data, a regular expression with back-references, represented by a finite-state machine (FSM). The device comprises a plurality of parallel processing elements (PPEs), an interconnection network for interconnecting the PPEs with each other, and a memory for receiving and storing input data. The PPEs process the input data stored in the memory, based on backtracking to process the back-references, and implement FA next state logic to generate new active FA configurations or mark themselves as available to receive active FA configurations. The interconnection network retrieves active FA configurations from the PPEs and allocates the active FA configurations to available PPEs. The PPEs are configured to match a regular expression in the input data.

14 Claims, 8 Drawing Sheets

(56) References Cited

U.S. PATENT DOCUMENTS

| | | | | |
|---|---|---|---|---|
| 7,511,738 | B1* | 3/2009 | Kancler | G06T 3/608 348/208.99 |
| 7,512,634 | B2* | 3/2009 | McMillen | H04L 63/145 |
| 7,689,530 | B1* | 3/2010 | Williams, Jr. | G06F 17/30985 706/62 |
| 7,725,510 | B2* | 5/2010 | Alicherry | G06F 17/30985 370/419 |
| 7,765,183 | B2* | 7/2010 | Williams, Jr. | G06F 17/30985 707/601 |
| 7,899,904 | B2* | 3/2011 | Ruehle | G06F 17/30985 709/200 |
| 7,945,528 | B2* | 5/2011 | Cytron | G06F 17/30985 706/62 |
| 8,015,208 | B2* | 9/2011 | McMillen | H04L 63/145 707/791 |
| 8,051,085 | B1 | 11/2011 | Srinivasan et al. | |
| 8,190,738 | B2* | 5/2012 | Ruehle | G06F 17/30985 709/224 |
| 8,413,124 | B2* | 4/2013 | Wang | H04L 69/22 717/140 |
| 8,612,376 | B2* | 12/2013 | Yamagaki | G06F 17/30985 706/20 |
| 8,683,590 | B2* | 3/2014 | Namjoshi | G06F 21/552 382/187 |
| 8,990,232 | B2* | 3/2015 | Rossi | G06F 9/444 707/737 |
| 9,305,116 | B2* | 4/2016 | Agarwal | G06F 17/30985 |
| 9,419,943 | B2* | 8/2016 | Goyal | H04L 63/0227 |
| 2003/0051043 | A1* | 3/2003 | Wyschogrod | G06F 17/30985 709/230 |
| 2003/0065800 | A1* | 4/2003 | Wyschogrod | G06F 17/30985 709/230 |
| 2003/0221013 | A1* | 11/2003 | Lockwood | H04L 41/08 709/231 |
| 2004/0215593 | A1* | 10/2004 | Sharangpani | G06F 17/30982 |
| 2006/0242123 | A1* | 10/2006 | Williams, Jr. | G06F 17/30985 |
| 2007/0192863 | A1* | 8/2007 | Kapoor | G06F 9/505 726/23 |
| 2008/0071783 | A1* | 3/2008 | Langmead | G06F 21/55 |
| 2008/0140600 | A1* | 6/2008 | Pandya | G06F 9/444 706/47 |
| 2008/0229415 | A1* | 9/2008 | Kapoor | G06F 21/55 726/22 |
| 2008/0262990 | A1* | 10/2008 | Kapoor | G06F 9/505 706/20 |
| 2008/0262991 | A1* | 10/2008 | Kapoor | G06F 21/55 706/20 |
| 2008/0271141 | A1* | 10/2008 | Goldman | H04L 63/1416 726/22 |
| 2010/0131935 | A1* | 5/2010 | Wang | H04L 69/22 717/143 |
| 2010/0138367 | A1* | 6/2010 | Yamagaki | G06F 17/30985 706/12 |
| 2010/0146623 | A1* | 6/2010 | Namjoshi | G06F 21/552 726/23 |
| 2010/0198850 | A1* | 8/2010 | Cytron | G06F 17/30985 707/758 |
| 2010/0315157 | A1* | 12/2010 | Na | G05F 1/56 327/539 |
| 2011/0258210 | A1* | 10/2011 | Agarwal | G06F 17/2775 707/758 |
| 2012/0011094 | A1* | 1/2012 | Yamagaki | G06F 7/02 706/45 |
| 2012/0240185 | A1* | 9/2012 | Kapoor | H04L 63/1425 726/1 |
| 2013/0133064 | A1* | 5/2013 | Goyal | H04L 63/0254 726/22 |
| 2013/0311495 | A1* | 11/2013 | Rossi | G06F 9/444 707/758 |
| 2014/0143195 | A1* | 5/2014 | Ruehle | G06K 9/6878 706/46 |
| 2014/0244554 | A1* | 8/2014 | Atasu | G06F 9/444 706/12 |
| 2015/0127925 | A1* | 5/2015 | Follett | G06F 15/8046 712/30 |
| 2015/0186786 | A1* | 7/2015 | Goyal | H04L 63/0227 706/48 |

OTHER PUBLICATIONS

'A Finite-State-Machine based string matching system for Intrusion Detection on High-Speed Networks' by Gerald Tripp, paper presented at: the 14th EICAR annual conference Saint Julians, Malta, Apr. 30-May 3, 2005.*

'Regex Tutorial Backreferences to Match the Same Text Again' by Jan Goyvaerts, archived from Jul. 7, 2015.*

'Runaway Regular Expressions: Catastrophic Backtracking' by Jan Goyvaerts, archived from Jul. 7, 2015.*

'Backtracking with Regular Expression Recursion and Subroutines' by Jan Goyvaerts, archived from Jul. 7, 2015.*

'Backreferences That Specify a Regular Expression Recursion Level' by Jan Goyvaerts, archived from Jul. 7, 2015.*

'Bitwise Data Parallelism in Regular Expression Matching' by Robert D. Cameron et al., PACT, pp. 139-150. ACM, New York (2014).*

'Regular Expression Matching Can Be Simple and Fast' by Russ Cox, Copyright 2007 Russ Cox.*

'Scalable Pattern Matching for High Speed Networks' by Christopher R. Clark and David E. Schimmel, Proceedings of the 12th Annual IEEE Symposium on Field-Programmable Custom Computing Machines (FCCM'04).*

'Optimization of Pattern Matching Circuits for Regular Expression on FPGA' by Lin et al., IEEE Transactions on Very Large Scale Integration (VLSI) Systems, vol. 15, No. 12, Dec. 2007.*

Atasu et al., "Hardware-Accelerated Regular Expression Matching for High-Throughput Text Analytics," Field Programmable Logic and Applications (FPL), 2013, 23rd International Conference, Sep. 2-4, 2013, pp. 1-7.

Atasu et al., "Apparatus for backtracking and back-referencing," IBM Research, Zurich, Sep. 16, 2014, pp. 1-8.

Atasu, "Resource-Efficient Regular Expression Matching Architecture for Text Analytics," Application-specific Systems, Architectures and Processors (ASAP), 2014 IEEE 25th International Conference, Jun. 18-20, 2014, pp. 1-8.

Krawczyk, "LFSR-based Hashing and Authentication," Advances in Cryptology—CRYPTO '94, LNCS 839, Springer-Verlag Berlin Heidelberg, 1994, pp. 129-139.

Bratko, "Prolog Programming for Artificial Intelligence, 3/E," Book Sheet Cover, © 2001, Pearson, Published Sep. 8, 2000, pp. 1-2.

Mitra et al., "Compiling PCRE to FPGA for Accelerating SNORT IDS," ANCS '07, Dec. 3-4, 2007, Orlando, Florida, USA, pp. 127-135.

Platzner, "Reconfigurable Accelerators for Combinatorial Problems," IEEE Computer Society, Computer, vol. 33, Issue 4, Apr. 2000, pp. 1-13.

Pao, "A NFA-Based Programmable Regular Expression Match Engine," ANCS '09, Oct. 19-20, 2009, Princeton, New Jersey, USA, pp. 60-61.

Herczeg, "Extending the PCRE Library with Static Backtracking Based Just-in-Time Compilation Support," CGO '14, Feb. 15-19, 2014, Orlando, FL, USA, pp. 306-315.

Sourdis et al., "Regular Expression Matching in Reconfigurable Hardware," Journal of Signal Processing Systems 51, 2008, pp. 99-121.

Mytkowicz et al., "Data-Parallel Finite-State Machines," ASPLOS '14, Mar. 1-5, 2014, Salt Lake City, Utah, USA, pp. 1-13.

* cited by examiner

REGULAR EXPRESSION MATCHING WITH BACK-REFERENCES USING BACKTRACKING

BACKGROUND

The present invention relates generally to the field of Input/Output data processing, and more particularly to a device for matching regular expressions in input data, where the regular expression is represented by a finite-state machine.

In various applications, such as network intrusion detection and text analytics, it is necessary to process input data streams, for example text documents. In this context, regular expressions, also called regexs, can be used to define search patterns. A regular expression may include one or more subexpressions. Back-referencing is a regex-matching feature that increases the expressive power of regular expressions by making it possible to refer back to a captured subexpression group as part of the regex definition. As a result, unlike standard regexs, which define regular grammars, regexs with back-references correspond to more powerful context-free grammars. However, software implementations of regex matching with back-references typically involve backtracking, and software-based backtracking implementations generally exhibit a low performance.

SUMMARY

Embodiments of the present invention disclose a device, method, and program product for matching, in input data, a regular expression with one or more back-references, represented by a finite-state machine (FSM).

A device comprises a plurality of parallel processing elements (PPEs), an interconnection network for interconnecting the PPEs with each other, and a memory for receiving and storing input data. The PPEs operate to process the input data stored in the memory, based on backtracking to process the back-references, and to implement FA next state logic to generate new active FA configurations or to mark themselves available to receive active FA configurations. The interconnection network operates to retrieve active FA configurations from the PPEs, and to allocate the active FA configurations to available PPEs. The PPEs are configured to match a regular expression in the input data.

In an aspect of the invention, the interconnection network operates to retrieve active FA configurations from a storage and from the plurality of PPEs, to allocate the retrieved active FA configurations to as many PPEs of the plurality of PPEs as are available, and to store any remaining retrieved active FA configurations in the storage.

In another aspect of the invention, the device further comprises a storage that includes a last-in first-out stack and/or a first-in first-out queue.

In a further aspect of the invention, each of the PPEs operates to capture a first string of the input data matching a subexpression of the regular expression, and another of the PPEs operates to capture a subsequently occurring string of the input data associated with a back-reference.

In a further aspect, each of the PPEs comprises a comparison unit for determining whether the subsequently occurring string is identical to the first string by comparing the subsequently occurring string against the first string, wherein each of the comparison units operates to direct the corresponding PPE, processing the current character of the subsequently occurring string, to mark itself as available, whenever the comparison fails.

In a further aspect, each of the comparison units operates to compare a current character of the subsequently occurring string against the first string when a state of the FSM associated with a back-reference is reached by the respective PPE.

In another aspect, each of the PPEs includes a checksum unit for computing a checksum of the first string and for computing a checksum of the subsequently occurring string, wherein each of the plurality of PPEs comprises a comparison unit for determining whether the subsequently occurring string differs from the first string by comparing the computed checksums.

In another aspect, each checksum unit operates to compute the checksum incrementally by using a current checksum and a current character of the first string and/or the subsequently occurring string.

In another aspect, the PPEs are configured to process the input data by operating synchronously on the same input character of the input data.

In another aspect, each of the active FA configurations has a current offset value, and the interconnection network operates to collect the active FA configurations from each of the PPEs and from the storage, to sort the active FA configurations in increasing order of current offset value, to select a number of active FA configurations having a smallest current offset value, the number being less than or equal to the number of PPEs, and to allocate the number of active FA configurations to the PPEs.

In another aspect, the PPEs are configured to communicate with the memory via one memory port.

In another aspect, the PPEs are configured to process the input data by operating independently on different input characters of the input data.

In another aspect, the PPEs are configured to communicate with the memory via a plurality of memory ports.

In another aspect, the memory includes multiple chips, and the input data are stored distributed to the multiple chips.

In another aspect, the PPEs are divided into groups, where each group is mapped to one of the multiple chips.

In another aspect, the interconnection network operates to transfer the active FA configurations to a group of PPEs of the plurality of PPEs, with the group mapped to the chip of the multiple chips that includes the input data relevant to the active FA configurations.

In another aspect, each of the FA configurations includes a pointer to a current character position in the input data.

In another aspect, the device further comprises a plurality of stream caches that support concurrent memory accesses.

In the following, exemplary embodiments of the present invention are described with reference to the enclosed figures.

BRIEF DESCRIPTION OF THE DRAWINGS

Similar or functionally similar elements in the figures have been allocated the same reference signs if not otherwise indicated.

DETAILED DESCRIPTION

Embodiments of the present invention are directed generally to devices 100 for matching a regular expression in an input data stream, which parallelize backtracking and back-referencing using a network of PPEs 20, a storage 10, and an optimized memory system 40, all of which are dynamically managed.

Back-referencing is a powerful regular expression (regex) matching feature that has various applications, for example, in network intrusion detection and in the text analytics domain. Back-referencing can be implemented using backtracking-based algorithms, which generally exhibit low performance due to the sequential nature of backtracking.

A regular expression, also called regex, can be represented by a finite-state machine. Finite-state machines are also known as state machines or finite-state automata. The terms automaton and machine will be used interchangeably. The finite-state machine may be a deterministic finite-state machine or a non-deterministic finite-state machine (NFA). Regex matching can be performed by transforming a regex, for example, into an NFA and by processing an input data stream with the NFA.

Figure 1:
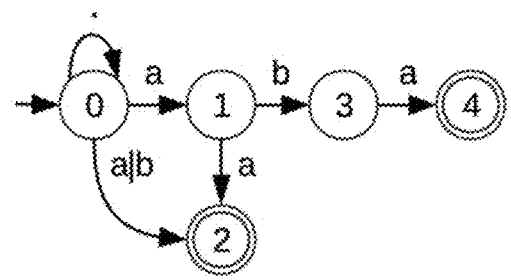
FIG. 1 shows an example of a non-deterministic finite-state automaton (NFA).
Figure 2:
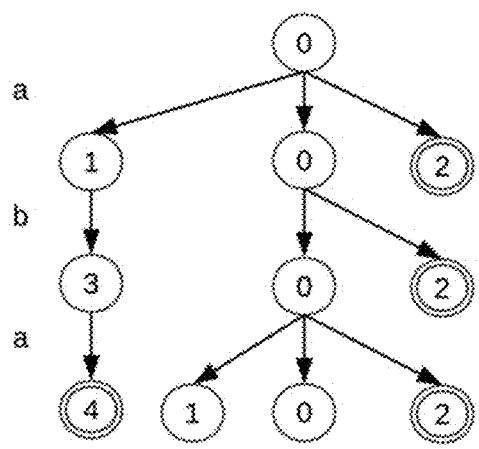
FIG. 2 shows the active states of the NFA of FIG. 1 during a breadth-first search.

For example, FIG. 1 shows the NFA of the regex a|b|aa|aba. The nodes in FIG. 1 represent NFA states and the edges represent state transitions. For regexs without back-references, it is possible to statically compute the maximum number of NFA states that can be concurrently active. Using this information, a network of state machines can be built that can perform a parallel breadth-first search on the input text. As an example, the NFA shown in FIG. 1 can have at most four of its states active at any time for any possible input combination. Thus, a breadth-first search can be implemented without backtracking if a network of dimension four is available. FIG. 2 shows all search paths that are produced for the input string "aba", which activates at most four NFA states at a time.

For regexs with back-references, it is not possible to completely parallelize the breadth-first search. The reason is that while simulating the NFA of a regex with back-references, it may be necessary to keep track of an arbitrarily large number of parallel search paths, such that computer performance is degraded. Now, the regex (ab.*cd).*\1 will be considered, which contains a back-reference, indicated by \1, which refers to the capturing subexpression group (ab.*cd). However, finding a second instance of (ab.*cd) in the input text is not sufficient: the strings matched by these two instances must be exactly the same. For example, the input text may contain a substring that has the format "abab . . . cdcd", which might contain arbitrarily many substrings that match (ab.*cd). The regex matcher has to remember all of these substrings matched and make sure that if a further instance of (ab.*cd), referred to as a second string, is found in the text, its string value is exactly the same as that of the first string previously matched. Consequently, regexs with back-references are supported by a backtracking architecture. The term second string, as used herein, refers to any subsequent substring that matches a first instance of a substring corresponding to a capturing group, of which one or more may be present. It will be appreciated by those skilled in the art that embodiments described herein generalize to multiple second strings.

Figure 3:
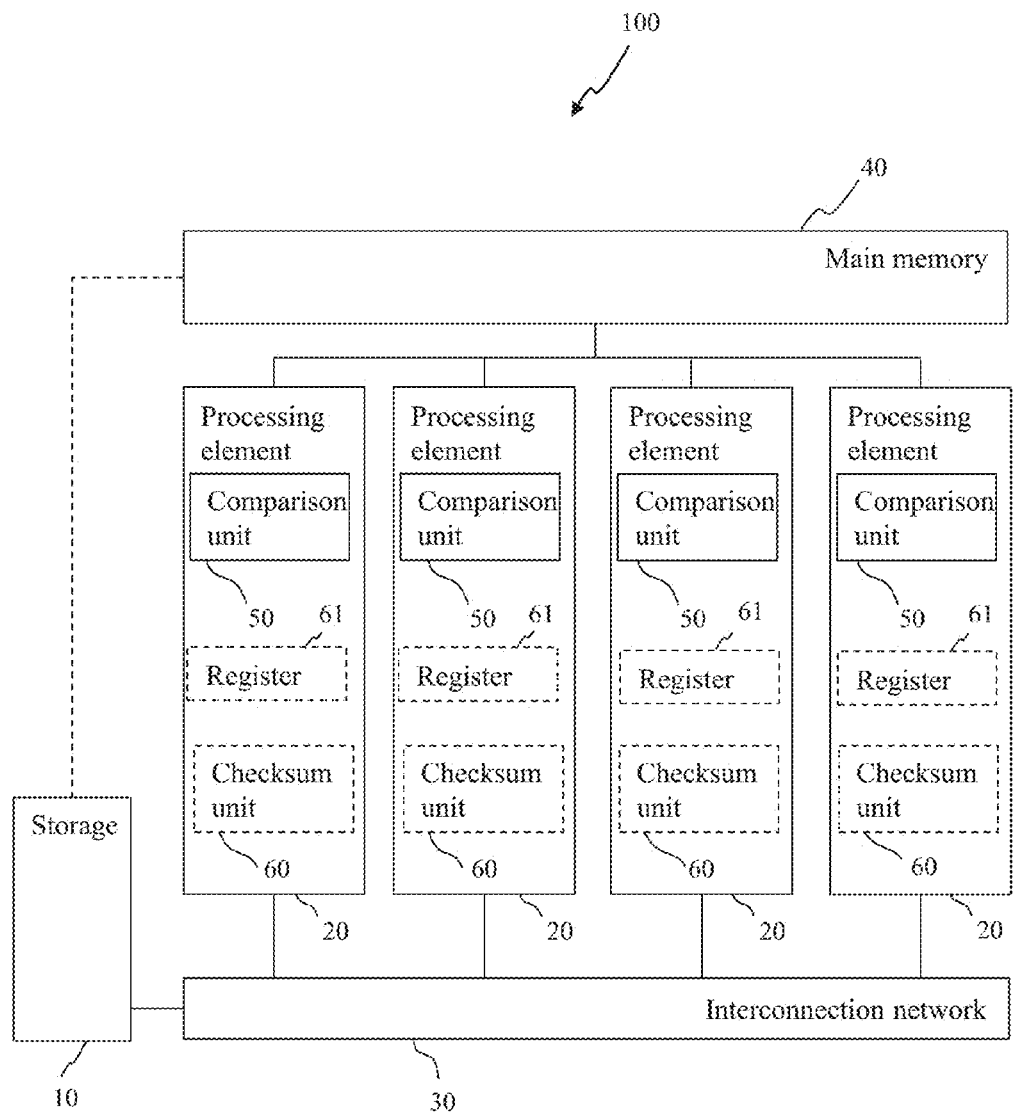
FIG. 3 depicts a device for matching a regular expression in input data, in accordance with an embodiment of the invention.

FIG. 3 depicts a device 100 for matching a regular expression in input data, which supports backtracking and back-referencing, in accordance with an embodiment of the invention. Device 100 includes two or more parallel processing elements (PPEs) 20. Each of the PPEs 20 can store at least one active finite-state automaton (FA) configuration in one or more registers 61. The FA configuration can be a non-deterministic or a deterministic FA configuration. Each of the PPEs 20 may also be capable of implementing the next state computation logic of the FSM, generating as output one or more FA configurations per input character processed.

The device 100 further includes a storage 10 for storing active FAs. The storage 10 may be utilized as a last-in first-out (LIFO) stack, or simply stack, and/or a first-in first-out (FIFO) queue, or simply queue. In the following, in all cases where storage 10 is described as being a stack, a queue may be used instead. The storage 10 may also have the capability of being accessed randomly.

The device 100 further includes an interconnection network 30. The interconnection network 30 interconnects the PPEs 20 with each other and the PPEs 20 with the storage 10.

The device 100 also includes a memory 40 for receiving and storing input data. The PPEs 20 operate to process the input data stored in the memory 40, based on backtracking and back-referencing.

The interconnection network 30 can retrieve active FA configurations from the PPEs 20 or from the storage 10, can allocate a first subset of active FA configurations to available PPEs 20 of the PPEs 20, and can store a second subset of the active FA configurations in the storage 10. The first subset and the second subset may each be all, some, or none of the active FA configurations. Examples of how this can be performed will be described in reference to subsequent figures.

The PPEs 20 are configured, when processing the input data, to match a regular expression in the input data and are configured to support backtracking and back-referencing.

Each of the PPEs 20 can generate new active FA configurations or inactivate itself, i.e., indicate that it does not contain an active FA configuration and is available to store further active FA configurations.

The interconnection network 30 collects active FA configurations from the storage 10 and from each of the PPEs 20 and allocates active FA configurations to as many PPEs 20 as are available. The remaining active FA configurations are stored in the storage 10. The storage 10 can be connected to the main memory 40 for dealing with overflow. This means that the main memory 40 can be used as an extended storage by the storage 10. The storage 10 can serve in such a case as a cache for storing the FA configurations most likely to be reused.

When processing the input data, each of the PPEs 20 captures a first string of the input data matching a subexpression of the regular expression. Each of the PPEs 20 may also capture a subsequently occurring, or second, string of the input data that is associated with a back-reference, and determine whether the second string is identical to the first string. If a regular expression includes back-references, a number of possibly overlapping strings are captured, and subsequent instances of these strings are located in the input data by the respective back-references.

To determine whether the second string is identical to the first string, each of the PPEs 20 includes a comparison unit 50 for comparing the second string against the first string. When the comparison fails, each of the comparison units 50 may direct the corresponding PPE 20 to inactivate itself. The comparison may be carried out by comparing a current character of the second string against the first string when a state of the FSM associated with a back-reference is reached by the respective PPE 20.

In certain embodiments, each of the PPEs 20 includes a checksum unit 60 for computing a checksum of the first string and for computing a checksum of the second string. If there are multiple back-references, multiple checksum units 60 may be needed per PPE 20, if the respective subexpressions overlap.

When using checksum units 60, the comparison units 50 may determine whether the second string differs from the first string by comparing the computed checksums. The checksum may be computed incrementally by using a current checksum and a current character of the first string and/or the second string.

The PPEs 20 can process the input data by operating synchronously on the same input character of the input data or by operating independently on different input characters of the input data.

It should be noted that the input data may be processed by performing a parallel breadth-first search, i.e., using storage 10 as a queue, or by performing depth-first search, i.e., using storage 10 as a stack. Breadth-first search and depth-first search denote algorithms for traversing or searching data structures, here the input data. A breadth-first search starts at the tree root (or some arbitrary node of a graph) and explores the neighbor nodes first, before moving to the next level neighbors. In contrast, a depth-first search can be performed which starts at the root and explores as far as possible along each branch before backtracking.

When using storage 10 as a queue, a strict breadth-first search on the input text can be achieved by operating all the PPEs 20 synchronously on the same input character.

According to this embodiment, each of the active FA configurations stores a current offset position, or value, in the input data stream, and the interconnection network 30 operates to collect the active FA configurations from each of the PPEs 20 and from the storage 10, to sort the active FA configurations in increasing offset value order based on the current offset value, to select a number N of active FA configurations having the smallest current offset value, the number N being less than or equal to the number of PPEs 20, and to allocate the selected active FA configurations to the PPEs 20.

For example, the number of PPEs 20 is N=4, and each PPE 20 can produce up to two output configurations. Thus, there are 2N=8 configurations that can be produced by the PPEs 20 and N=4 configurations that can be pulled from the storage 10, used as a queue. Therefore, interconnection network 30 receives 12 configurations in total. The configurations are sorted, and, for example, 2 of the 12 configurations have the smallest current offset value and the remaining 10 have a higher current offset value. In this case, the 2 configurations with the smallest current offset value are forwarded to the PPEs 20, and the remaining 10 are stored in the queue.

The respective unit or entity, e.g., the comparison unit or the PPEs, may be implemented in hardware and/or in software. If the unit is implemented in hardware, it may be embodied as a device, e.g., as a processor or as a part of a system, e.g., a computer system. If the unit is implemented in software it may be embodied as a computer program product, as a function, as a routine, as a program code, or as an executable object.

Figure 4:
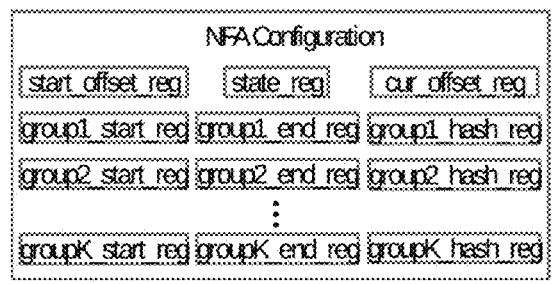
FIG. 4 depicts NFA configuration information, in accordance with an embodiment of the invention.

FIG. 4 shows the contents of a PPE register 61 of FIG. 3, which stores an NFA configuration. An NFA configuration may include a start offset pointer, a current offset pointer, a current state value, one or more capturing group start and end offset pointers, and a set of checksum or hash values associated with each capturing group.

Figure 5:
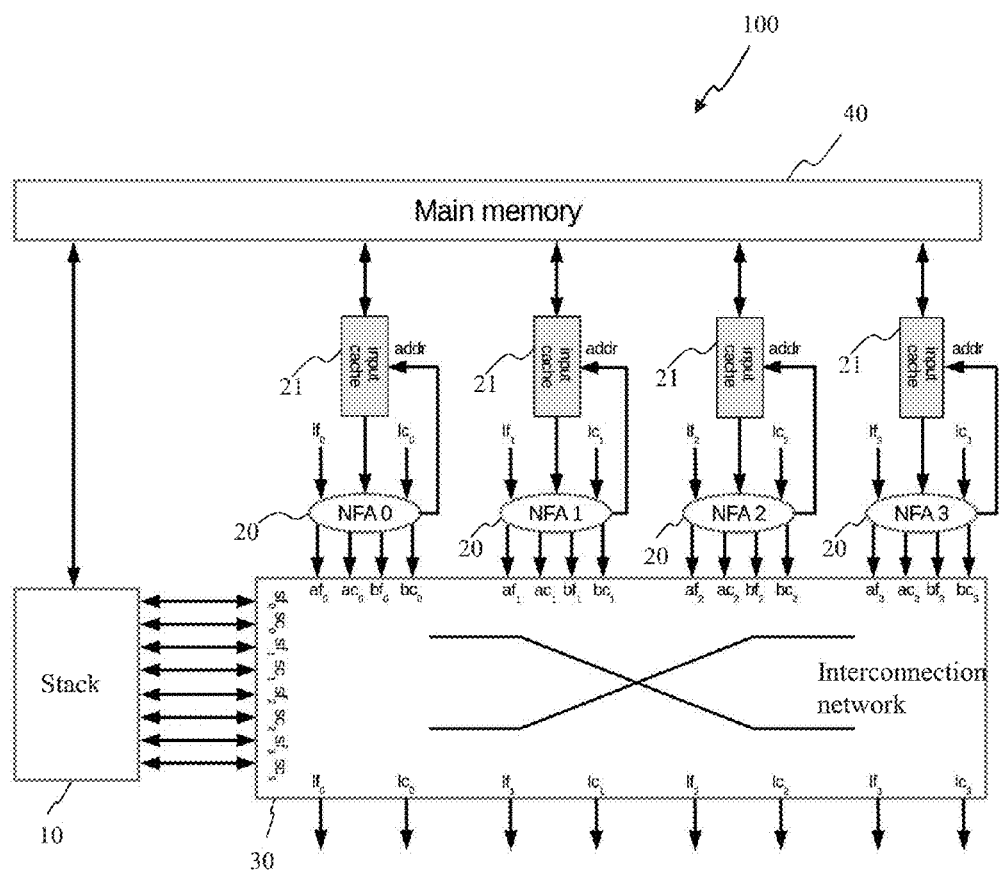
FIG. 5 depicts another device for matching a regular expression in input data, in accordance with an embodiment of the invention.

FIG. 5 depicts a second device 100 for matching a regular expression in input data, in accordance with an embodiment of the invention. The device 100 of FIG. 5 couples the PPEs 20 with storage 10, used as a stack, through the interconnection network 30. Each PPE 20 stores a single NFA configuration (NFA0-NFA3) in its registers and implements the next state computation logic of the NFA, producing one or more output configurations per input character consumed. The consumed input characters can be buffered in an input cache 21. Each PPE 20 can be coupled to the main memory 40 via such an input cache 21.

Figure 6:
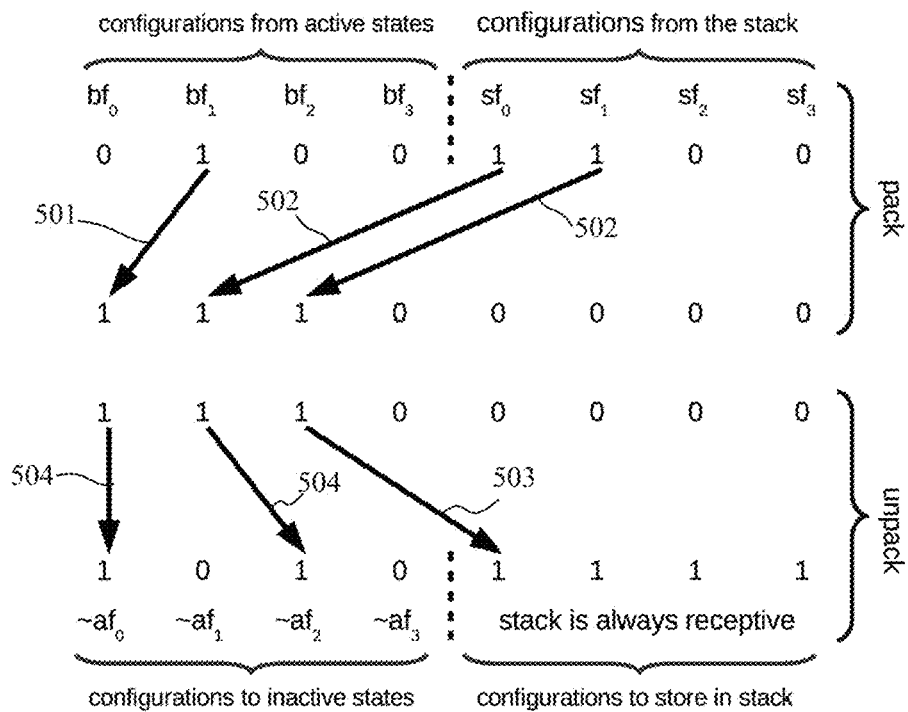
FIG. 6 shows an example of routing NFA configurations between the parallel processing elements (PPEs) and the storage of FIG. 3, in accordance with an embodiment of the invention.

FIG. 6 illustrates a way of implementing the routing logic between the PPEs 20 and the storage 10, used as a stack, in accordance with an embodiment of the invention. Initially, only one PPE 20 is active, which is loaded with the initial state of the NFA. While processing the input stream, the number of active PPEs, corresponding to active NFA configurations, may increase due to non-deterministic state transitions. In such cases, the PPEs 20 that produce more than one NFA configuration assert their branch flags (bf0-bf3). If there are available, i.e., inactive, PPEs 20, the additional configurations can be allocated to these PPEs 20 (indicated by arrows 501, 504). If the number of additional NFA configurations is larger than the number of inactive PPEs 20, the excess ones are stored, as indicated by arrow 503, in the storage 10, used as a stack, to be retrieved later (indicated by arrows 502) when PPEs 20 become available again. This mechanism can be implemented using the pack/unpack network as shown in FIG. 6. It should be noted that instead of a sequence of pack and unpack operations, a wide pack operation may be performed.

Figure 7:
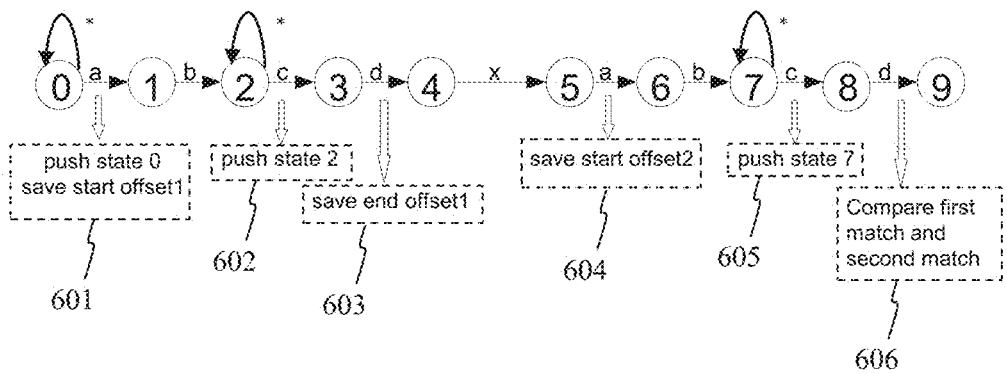
FIG. 7 shows an NFA-based representation for matching a regular expression with back-references in input data, in accordance with an embodiment of the invention.

FIG. 7 illustrates the NFA representation of an example regular expression (regex), .*(ab.*cd)x\1, which has a back-reference, indicated by \1, referring to the capturing group (ab.*cd). Here, \1 is replaced with (ab.*cd) in the NFA for ease of understanding. The NFA also shows the non-deterministic state transitions caused by the .* construct in the regex.

Referring to FIG. 7, as implemented in device 100 of FIG. 3, a comparison of the comparison units 50 will be positive if the string matched by the capturing group in the regex, between state 0 and state 4, is the same as the back-reference that is matched between state 5 and state 9. This can be achieved by comparing the input data against the first string as soon as reaching state 5, and backtracking, making the current PPE 20 inactive, as soon as the string comparison fails. When storing the regular expression, a start offset1 is saved 601, if there is only a single PPE available, state 0 is pushed to storage 10, use as a stack. Then, an end offset1 is saved 603. Before this, state 2 is pushed 602. In the second group of PPEs 20, the PPEs 20 processing the input data for detecting a match, also saves a start offset2 604. In the illustrated case, state 7 is pushed. After state 8, the first match and the second match are compared 606. The pushed configurations can be pulled from the stack when backtracking.

As described above, alternatively, a hash unit can be incorporated into each PPE 20 to compute a hash of the first string, and to compute a hash of the second string matched by the back-reference, and compare the hash values instead of comparing complete strings.

In one embodiment, the PPEs 20 process the input data by operating synchronously on the same input character of the input data. In this case, the PPEs 20 communicate with the memory 40 via one memory port.

Back-referencing implementation also has an impact on the number of memory ports. To support back-referencing, the device 100 can support hashing or direct string comparison as described above. For example, the following implementations for the PPEs 20 and the memory ports are possible:

1a) N hash units, 1 memory port;
1b) 0 hash units, N+1 memory ports;
2a) N hash units, N memory ports;
2b) 0 hash units, 2N memory ports.

Figure 8:
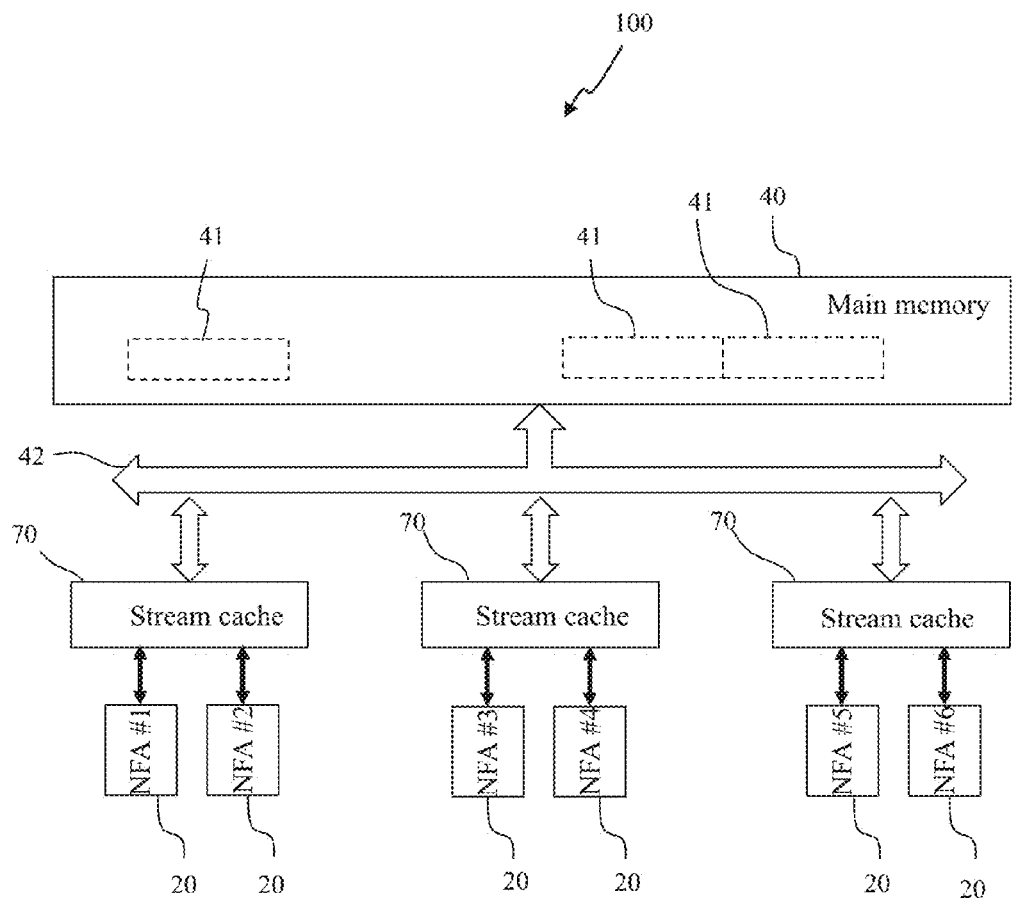
FIG. 8 depicts another device for matching a regular expression in input data, in accordance with an embodiment of the invention.

As illustrated in FIG. 8, stream caches 70 may be used to increase the number of concurrent memory accesses and to improve the access bandwidth. When the input data chunks (e.g., text documents) are relatively small, the documents can simply be replicated in the stream caches 70. When the input data chunks are large, and cannot be fully duplicated, the stream caches 70 can store a relevant window of the input data, exploiting the sequential nature of the memory accesses during forward processing and during backtracking. Multiple PPEs 20 may be connected to the same stream cache 70. The back-referenced strings and the input stream can share the same stream cache 70 or can be allocated in separate stream caches 70. The stream caches 70 may be connected to the, for example DRAM-based, main memory 40. Different portions of the input data can be stored in different parts 41 of the main memory 40.

Figure 9:
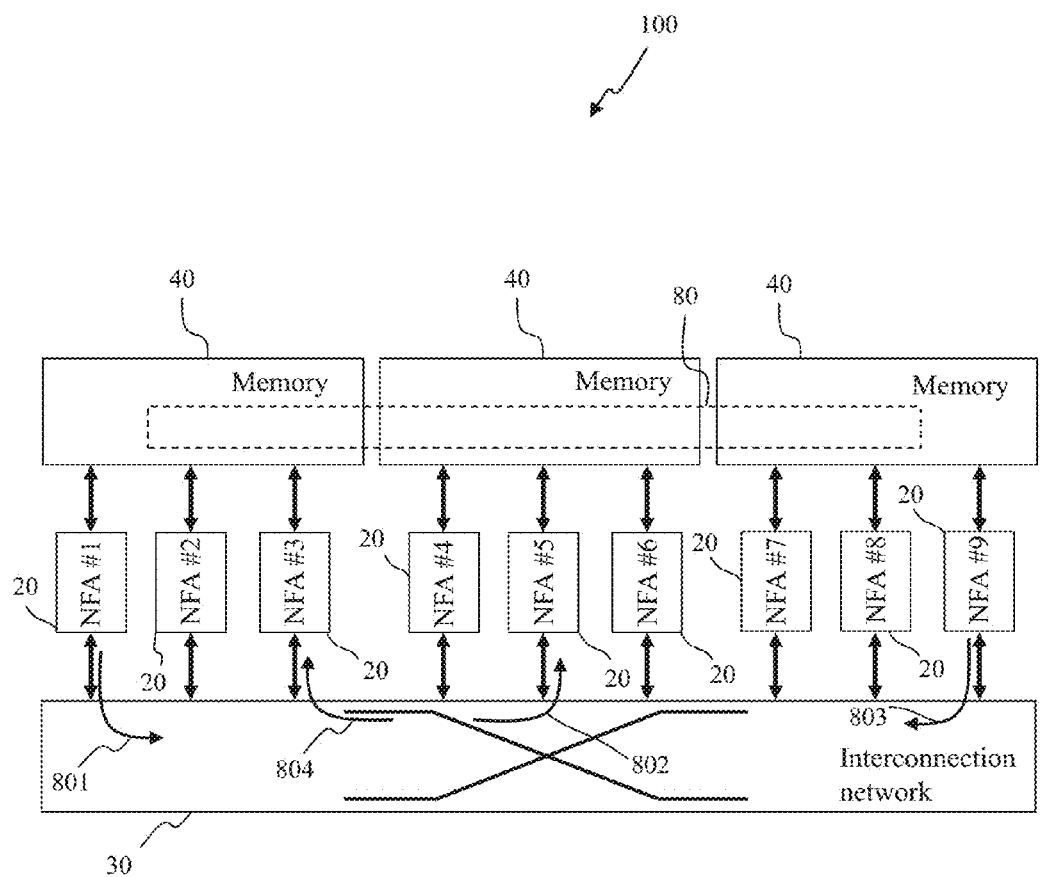
FIG. 9 depicts another device for matching a regular expression in input data, in accordance with an embodiment of the invention.

The device 100 can operate on multiple input streams concurrently. It can also operate on different regions of the same input stream in parallel, as illustrated in FIG. 9. For example, while handling large text documents 80 that are split across multiple DRAM devices and controllers 40, each PPE 20 can be mapped to a dedicated cluster having access to a limited address space. Whenever memory boundaries are crossed, the interconnection network 30 can transfer the NFA configurations to the cluster that has access to the relevant address space. For example, an NFA configuration can be forwarded 801, 802 from NFA#1 to NFA#5 whereas another NFA configuration can be transferred 803, 804 from NFA#9 to NFA#3.

Figure 10:
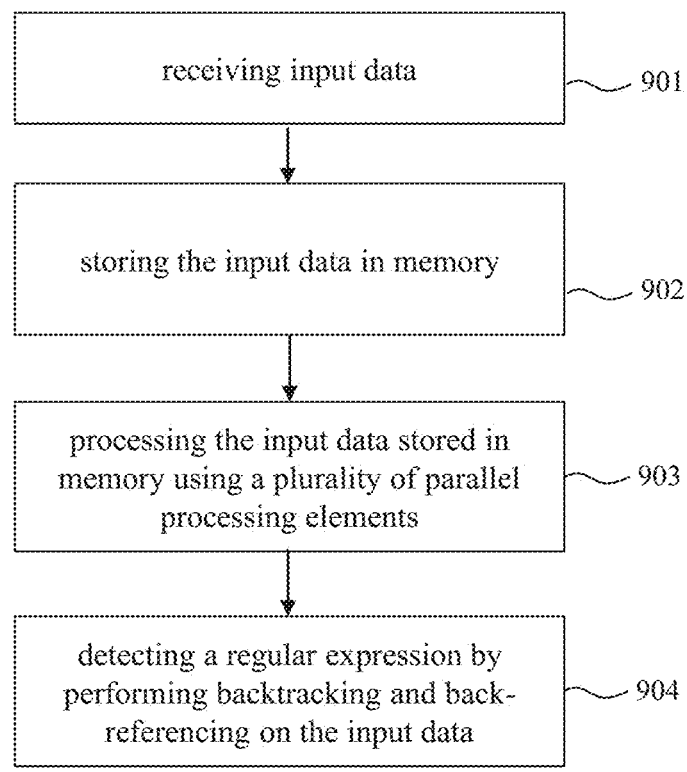
FIG. 10 is a flowchart showing various steps for matching a regular expression in input data, in accordance with an embodiment of the invention.

FIG. 10 shows an embodiment of a sequence of method steps for matching a regular expression in input data. The method of FIG. 10 has the following steps 901-904. Input data is received (step 901). The input data is stored in a memory (step 902). The input data stored in the memory is processed using a plurality of PPEs, each of which is capable of storing an active FA configuration, by retrieving active FA configurations from the PPEs or from the storage, allocating a first subset of the active FA configurations to available PPEs of the plurality of PPEs, and storing a second subset of the active FA configurations in a storage (step 903). When processing the input data, a match for the regular expression is detected in the input data (step 904).

Computerized devices may be suitably designed for implementing embodiments of the present invention as described herein. In that respect, it may be appreciated that the method described herein is largely non-interactive and automated. In exemplary embodiments, the method described herein may be implemented either in an interactive, partly-interactive or non-interactive system. The method described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 10 may be implemented in software, as an executable program, the latter executed by suitable digital processing devices. More generally, embodiments of the present invention may be implemented wherein general-purpose digital computers, such as personal computers, workstations, etc., are used.

Figure 11:
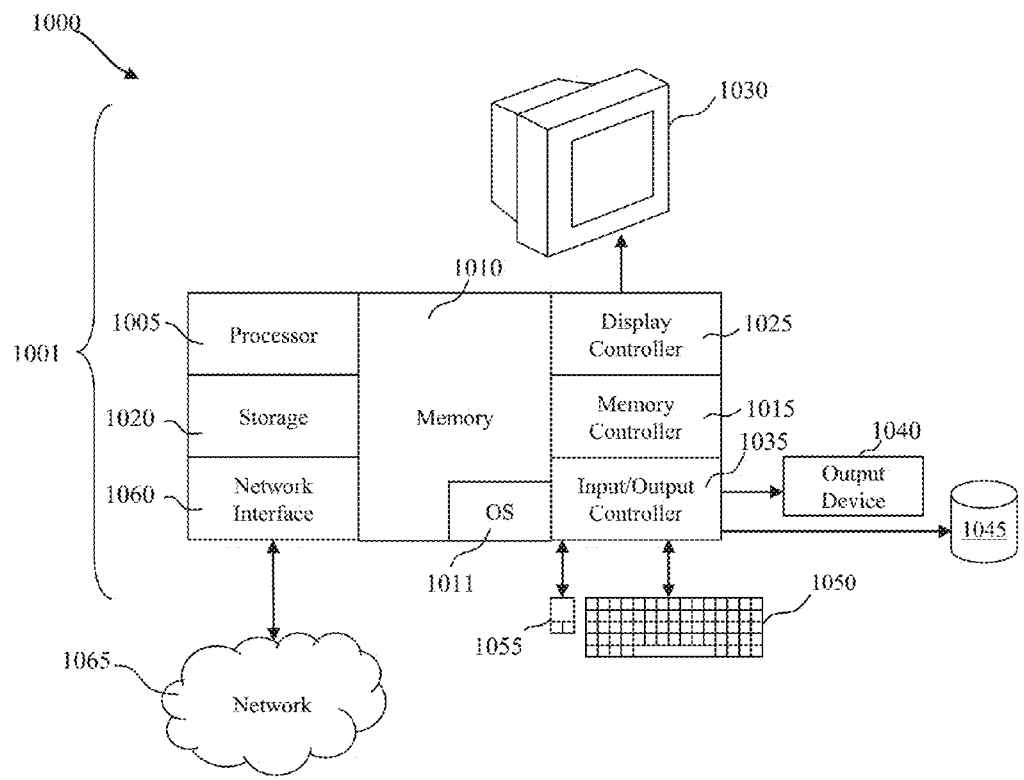
FIG. 11 is a schematic block diagram of a system adapted to performing the method for matching a regular expression in input data, in accordance with an embodiment of the invention.

For instance, the system 1000 depicted in FIG. 11 schematically represents a computerized unit 1001, e.g., a general-purpose computer. In exemplary embodiments, in terms of hardware architecture, as shown in FIG. 11, the unit 1001 includes a processor 1005, memory 1010 coupled to a memory controller 1015, and one or more input and/or output (I/O) devices 1040, 1045, 1050, 1055 (or peripherals) that are communicatively coupled via a local input/output controller 1035. The input/output controller 1035 can be, but is not limited to, one or more buses or other wired or wireless connections, as is known in the art. The input/output controller 1035 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1005 is a hardware device for executing software, particularly that stored in memory 1010. The processor 1005 can be any custom made or commercially available processor, a central processing unit (CPU), an auxiliary processor among several processors associated with the computer 1001, a semiconductor based microprocessor (in the form of a microchip or chip set), or generally any device for executing software instructions.

The memory 1010 can include any one or combination of volatile memory elements (e.g., random access memory) and nonvolatile memory elements. Moreover, the memory 1010 may incorporate electronic, magnetic, optical, and/or other types of storage media. Note that the memory 1010 can have a distributed architecture, where various components are situated remote from one another, but can be accessed by the processor 1005.

The software in memory 1010 may include one or more separate programs, each of which comprises an ordered listing of executable instructions for implementing logical functions. In the example of FIG. 10, the software in the memory 1010 includes methods described herein in accordance with exemplary embodiments and a suitable operating system (OS) 1011. The OS 1011 essentially controls the execution of other computer programs, such as the method as described herein (e.g., FIG. 9), and provides scheduling, input-output control, file and data management, memory management, and communication control and related services.

The method described herein may be in the form of a source program, executable program (object code), script, or any other entity comprising a set of instructions to be performed. When in a source program form, then the program needs to be translated via a compiler, assembler, interpreter, or the like, as known per se, which may or may not be included in the memory 1010, so as to operate properly in connection with the OS 1011. Furthermore, the method can be written as an object oriented programming language, which has classes of data and methods, or a procedure programming language, which has routines, subroutines, and/or functions.

Possibly, a conventional keyboard 1050 and mouse 1055 can be coupled to the input/output controller 1035 (in particular for the BS, if needed). Other I/O devices 1040-1055 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 1035 for further processing. Sensor nodes are ideally small, consume low energy, are autonomous and operate unattended.

In addition, the I/O devices 1040-1055 may further include devices that communicate both inputs and outputs. The system 1000 can further include a display controller 1025 coupled to a display 1040. In exemplary embodiments, the system 1000 can further include a network interface or transceiver 1060 for coupling to a network 1065.

The network 1065 transmits and receives data between the unit 1001 and external systems. The network 1065 is possibly implemented in a wireless fashion, e.g., using wireless protocols and technologies, such as WiFi, WiMax, etc. The network 1065 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 1065 can also be an IP-based network for communication between the unit 1001 and any external server, client and the like via a broadband connection. In exemplary embodiments, network 1065 can be a managed IP network administered by a service provider. Besides, the network 1065 can be a packet-switched network such as a LAN, WAN, Internet network, etc.

If the unit 1001 is a PC, workstation, intelligent device or the like, the software in the memory 1010 may further include a basic input output system (BIOS). The BIOS is stored in ROM so that the BIOS can be executed when the computer 1001 is activated.

When the unit 1001 is in operation, the processor 1005 operates to execute software stored in the memory 1010, to communicate data to and from the memory 1010, and to generally control operations of the computer 1001 pursuant to the software. The method described herein and the OS 1011, in whole or in part are read by the processor 1005, typically buffered in the processor 1005, and then executed. When the method described herein is implemented in software, the method can be stored on any computer readable medium, such as storage 1020, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium in the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling in the scope of the appended claims.

What is claimed is:

1. A device for matching a regular expression in input data, wherein the regular expression includes one or more back-references and is represented by a finite-state machine (FSM), the device comprising:
   a plurality of parallel processing elements (PPEs);
   an interconnection network for interconnecting the plurality of PPEs with each other; and
   a memory for receiving and storing input data;
   wherein the PPEs operate to process the input data stored in the memory, based on backtracking to process the back-references, and to implement finite-state automaton (FA) next state logic to generate new active FA configurations or to mark themselves as available to receive active FA configurations;
   wherein a first PPE operates to capture a first string of the input data matching a subexpression of the regular expression and another of the PPEs operates to capture a subsequently occurring string of the input data associated with a back-reference;
   wherein each of the plurality of PPEs comprises a comparison unit for determining whether the subsequently occurring string is identical to the first string by comparing the subsequently occurring string with the first string, wherein each of the comparison units operates to direct the corresponding PPE, processing a current character of the subsequently occurring string, to mark itself as available, whenever a comparison fails;
   wherein the interconnection network operates to retrieve active FA configurations from the PPEs, and to allocate the active FA configurations to available PPEs of the plurality of PPEs; and
   wherein the plurality of PPEs is configured to match a regular expression in the input data.

2. The device of claim 1, wherein the interconnection network operates to retrieve active FA configurations from a storage and from the plurality of PPEs, to allocate the retrieved active FA configurations to as many PPEs of the plurality of PPEs as are available, and to store any remaining retrieved active FA configurations in the storage.

3. The device of claim 2, wherein the storage is configured as a last-in first-out stack or a first-in first-out queue.

4. The device of claim 1, wherein each of the comparison units operates to compare a current character of the subsequently occurring string against the first string when a state of the FSM associated with a back-reference is reached by the respective PPE.

5. The device of claim 1, wherein each of the plurality of PPEs operates to process the input data by operating synchronously on the same input character of the input data.

6. The device of claim 5, wherein each of the active FA configurations has a current input data offset value, and wherein the interconnection network operates to collect the active FA configurations from each of the plurality of PPEs, to sort the active FA configurations in increasing order of current offset value, to select a number of active FA configurations having smallest current offset value, the number being less than or equal to the number of PPEs, and to allocate the number of active FA configurations to the plurality of PPEs.

7. The device of claim 5, wherein the plurality of PPEs operates to communicate with the memory via one memory port.

8. The device of claim 1, wherein the plurality of PPEs operates to process the input data by operating independently on different input characters of the input data.

9. The device of claim 8, wherein the plurality of PPEs operates to communicate with the memory via a plurality of memory ports.

10. The device of claim 1,
wherein the memory includes multiple chips, and
wherein the input data are stored by being distributed to the multiple chips.

11. The device of claim 10,
wherein the plurality of PPEs is divided into groups of PPEs, and
wherein each group of PPEs is mapped to one of the multiple chips.

12. The device of claim 11, wherein the interconnection network operates to transfer the active FA configurations to a group of PPEs of the plurality of PPEs, the group mapped to a chip of the multiple chips including the input data relevant for the active FA configurations.

13. The device of claim 1, wherein each of the FA configurations includes a pointer to a current character position in the input data.

14. The device of claim 1, further comprising a plurality of stream caches that support concurrent memory accesses.

* * * * *